US012628233B2

(12) United States Patent
Sebire et al.

(10) Patent No.: US 12,628,233 B2
(45) Date of Patent: May 12, 2026

(54) SMALL DATA TRANSMISSION CONTROL

(71) Applicant: Nokia Technologies Oy, Espoo (FI)

(72) Inventors: Benoist Pierre Sebire, Minato-ku (JP);
Tero Henttonen, Espoo (FI);
Jussi-Pekka Koskinen, Oulu (FI);
Samuli Heikki Turtinen, Ii (FI)

(73) Assignee: Nokia Technologies Oy, Espoo (FI)

( * ) Notice: Subject to any disclaimer, the term of this
patent is extended or adjusted under 35
U.S.C. 154(b) by 372 days.

(21) Appl. No.: 18/031,939

(22) PCT Filed: Oct. 16, 2020

(86) PCT No.: PCT/EP2020/079251
§ 371 (c)(1),
(2) Date: Apr. 14, 2023

(87) PCT Pub. No.: WO2022/078613
PCT Pub. Date: Apr. 21, 2022

(65) Prior Publication Data
US 2023/0389109 A1     Nov. 30, 2023

(51) Int. Cl.
H04W 76/20          (2018.01)
H04W 76/30          (2018.01)

(52) U.S. Cl.
CPC ........... H04W 76/20 (2018.02); H04W 76/30
(2018.02)

(58) Field of Classification Search
CPC . H04W 76/20; H04W 76/30; H04W 52/0229;
H04W 52/0216; H04W 24/10; H04W
72/1268; H04W 72/566; H04W 76/27;
Y02D 30/70
See application file for complete search history.

(56) References Cited

U.S. PATENT DOCUMENTS

| | | | | |
|---|---|---|---|---|
| 11,582,634 B2* | 2/2023 | Lei | ........................ | H04W 72/56 |
| 11,985,710 B2* | 5/2024 | Liu | ..................... | H04W 74/002 |
| 12,167,317 B2* | 12/2024 | Tseng | .................... | H04W 48/06 |
| 2021/0211947 A1* | 7/2021 | Agiwal | ................. | H04W 72/23 |

(Continued)

FOREIGN PATENT DOCUMENTS

| | | |
|---|---|---|
| CN | 104185214 A | 12/2014 |
| WO | WO2013008208 A1 | 1/2013 |

(Continued)

OTHER PUBLICATIONS

ZTE corporation, 3GPP tsg_ran\tsg_ran,tsgr_89e, Sanechips,RP-201537 "Status Report to TSG: NR small data transmissions in INACTIVE state", Sep. 7, 2020.

(Continued)

*Primary Examiner* — Jay P Patel
(74) *Attorney, Agent, or Firm* — McCarter & English LLP

(57)          ABSTRACT

There are provided apparatuses, methods and computer program products. In accordance with an embodiment, there is disclosed a method including determining whether initiating a transmission of a signaling message using a small data transmission procedure is allowed in an inactive state of a user equipment; based on the determination causing the user equipment either to perform: transmitting the signaling message using the small data transmission procedure in the inactive state; or transmitting the signaling message using a procedure other than the small data transmission procedure.

21 Claims, 6 Drawing Sheets

(56) References Cited

U.S. PATENT DOCUMENTS

| | | | | |
|---|---|---|---|---|
| 2021/0337602 A1* | 10/2021 | Liu | | H04W 28/26 |
| 2021/0337625 A1* | 10/2021 | Tsai | | H04W 76/27 |
| 2022/0022276 A1* | 1/2022 | Shih | | H04W 72/0453 |
| 2022/0078697 A1* | 3/2022 | Tseng | | H04W 72/21 |
| 2022/0086899 A1* | 3/2022 | Shih | | H04L 5/0053 |
| 2022/0086946 A1* | 3/2022 | Huang | | H04W 72/23 |
| 2023/0087615 A1* | 3/2023 | Park | | H04W 72/231 |
| | | | | 370/329 |
| 2023/0164773 A1* | 5/2023 | Alfarhan | | H04W 74/0833 |
| | | | | 370/329 |
| 2023/0189245 A1* | 6/2023 | Alfarhan | | H04L 1/1854 |
| | | | | 370/329 |
| 2023/0284315 A1* | 9/2023 | Wang | | H04W 74/0833 |
| | | | | 370/329 |
| 2023/0300831 A1* | 9/2023 | Koskinen | | H04W 76/19 |
| | | | | 370/329 |
| 2023/0354412 A1* | 11/2023 | Christoffersson | ... | H04W 74/002 |
| 2023/0379815 A1* | 11/2023 | Wang | | H04W 48/20 |
| 2023/0379860 A1* | 11/2023 | Rao | | H04W 64/00 |
| 2023/0389117 A1* | 11/2023 | Laselva | | H04W 74/08 |
| 2023/0413207 A1* | 12/2023 | Yue | | H04W 56/0045 |

FOREIGN PATENT DOCUMENTS

| | | | | |
|---|---|---|---|---|
| WO | WO2015059925 A1 | 4/2015 | | |
| WO | WO 2020/191059 A1 | 9/2020 | | |
| WO | WO-2020221861 A1 * | 11/2020 | ........ | H04W 74/0833 |
| WO | WO-2021043416 A1 * | 3/2021 | .......... | H04W 74/006 |

OTHER PUBLICATIONS

Intel Corporation, "SDT mechanism on RRC/non-RRC based approaches and RACH requirements," 3GPP TSG RAN WG2 Meeting #111-e, R2-2006713, Aug. 17-28, 2020.

OPPO, R2-2006836, Procedure of Small Data Transmission, 3GPP TSG RAN WG2 #111-E, 3GPP (Aug. 7, 2020).

\* cited by examiner

SMALL DATA TRANSMISSION CONTROL

CROSS REFERENCE TO RELATED APPLICATION

This patent application is a U.S. National Stage application of International Patent Application Number PCT/EP2020/079251 filed Oct. 16, 2020, which is hereby incorporated by reference in its entirety.

TECHNICAL FIELD

The present invention relates to a method and apparatus for controlling transmission of small amount of data from a user equipment to a wireless network when the user equipment is in an inactive state.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. In 5G systems a mobile communication device, which may also be called as a user equipment (UE), may be in different states depending whether it is connected with the network or not. For example, when the mobile communication device does not have an active data communication connection, the mobile communication device may be in a so-called inactive state or in an idle state. If the mobile communication device had a message to be transmitted when the mobile communication device is in the inactive state, the mobile communication device should typically change the state to connected and only after that may be able to transmit the message or messages.

Messages to be transmitted may not always be very long. Therefore, changing the state before transmitting the messages causes transmission of control messages for the state change and increases latency. Furthermore, such signalling also increases power consumption of the mobile communication device.

Signalling overhead from the inactive state for small data packets may be a problem and may become a critical issue with more user equipment in NR not only for network performance and efficiency but also for the UE battery performance.

Therefore, a mechanism to enable transmission of relatively short messages in the inactive state without changing the state might address the increased power consumption and latency.

SUMMARY

Some embodiments provide a method and apparatus for transmitting small amount of data from a user equipment to a wireless network when the user equipment is in an inactive state.

Some embodiments are implemented in the context of the 5G communication systems and relate to a network implementation of mechanisms for determining which kind of messages can be transmitted without changing the state of the user equipment from inactive state to connected state. In particular, some embodiments relate to controlling which radio resource control (RRC) messages are allowed to use small data transmission (SDT). In accordance with an embodiment, the network indicates the RRC messages that are allowed to use SDT, including whether the RRC messages are sent using a special RRC container or the existing messages. This could also include using a different signalling radio bearer (SRB) than normally, e.g. SRB2 for a message, or including the data in a container whose type is indicated via the message.

In accordance with an embodiment, the network decides and controls which RRC messages can use SDT and indicates this to the UE either via dedicated signalling or via broadcast. Following information may be indicated to the UE:

which RRC messages are allowed to use SDT (also called as inactive state data transmission in this specification);

If special RRC container or the existing messages are used;

if any UE originated signalling (ie., no mobile oriented data, MO-data) is allowed;

if size thresholds are defined for "UL data" and for "RRC message(s)" or any priority.

A separate SRB could be introduced for the use of SDT in RRC_INACTIVE.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided a user equipment comprising means for:

determining whether initiating a transmission of a signaling message using a small data transmission procedure is allowed in an inactive state of the user equipment;

causing, based on the determination, the user equipment to perform either:

transmitting the signaling message using the small data transmission procedure in the inactive state; or transmitting the signaling message using a procedure other than the small data transmission procedure.

According to a second aspect there is provided a method comprising:

determining whether initiating a transmission of a signaling message using a small data transmission procedure is allowed in an inactive state of a user equipment;

based on the determination causing the user equipment either to perform:

transmitting the signaling message using the small data transmission procedure in the inactive state; or transmitting the signaling message using a procedure other than the small data transmission procedure.

According to a third aspect there is provided an apparatus comprising at least one processor; and at least one memory including computer program code the at least one memory and the computer program code configured to, with the at least one processor, cause the apparatus to perform at least the following:

determine whether initiating a transmission of a signaling message using a small data transmission procedure is allowed in an inactive state of a user equipment;

based on the determination causing the apparatus either to perform:

transmit the signaling message using the small data transmission procedure in the inactive state; or transmit the signaling message using a procedure other than the small data transmission procedure.

According to a fourth aspect there is provided an apparatus comprising:

a first circuitry configured to obtain one or more messages for transmission, said one or more messages having an indication of a cause of the message;

a second circuitry configured to determine whether initiating a transmission of a signaling message using a small data transmission procedure is allowed in an inactive state of a user equipment;

a third circuitry configured to causing, based on the determination, the user equipment to perform either:

transmit the signaling message using the small data transmission procedure in the inactive state; or transmit the signaling message using a procedure other than the small data transmission procedure.

According to a fifth aspect there is provided a computer program comprising computer readable program code which, when executed by at least one processor; cause the apparatus to perform at least the following:

determine whether initiating a transmission of a signaling message using a small data transmission procedure is allowed in an inactive state of a user equipment;

based on the determination causing the apparatus either to perform:

transmit the signaling message using the small data transmission procedure in the inactive state; or transmit the signaling message using a procedure other than the small data transmission procedure.

According to a sixth aspect there is provided an apparatus comprising means for:

determining whether to enable transmission of a signaling message by a user equipment using a small data transmission procedure in an inactive state of the user equipment;

based on the determination, causing the apparatus to provide an indication to one or more user equipment if transmission of a signaling message by a user equipment using a small data transmission procedure in an inactive state of the user equipment is enabled.

According to a seventh aspect there is provided a method comprising:

determining whether to enable transmission of a signaling message by a user equipment using a small data transmission procedure in an inactive state of the user equipment;

based on the determination, providing an indication to one or more user equipment if transmission of a signaling message by a user equipment using a small data transmission procedure in an inactive state of the user equipment is enabled.

According to an eighth aspect there is provided an apparatus comprising at least one processor; and at least one memory including computer program code the at least one memory and the computer program code configured to, with the at least one processor, cause the apparatus to perform at least the following:

determine whether to enable transmission of a signaling message by a user equipment using a small data transmission procedure in an inactive state of the user equipment;

based on the determination, cause the apparatus to provide an indication to one or more user equipment if transmission of a signaling message by a user equipment using a small data transmission procedure in an inactive state of the user equipment is enabled.

According to a ninth aspect there is provided an apparatus comprising:

a first circuitry configured to determine whether to enable transmission of a signaling message by a user equipment using a small data transmission procedure in an inactive state of the user equipment;

a second circuitry configured to, based on the determination, cause the apparatus to provide an indication to one or more user equipment if transmission of a signaling message by a user equipment using a small data transmission procedure in an inactive state of the user equipment is enabled.

According to a tenth aspect there is provided a computer program comprising computer readable program code which, when executed by at least one processor; cause the apparatus to perform at least the following:

determine whether to enable transmission of a signaling message by a user equipment using a small data transmission procedure in an inactive state of the user equipment based on the determination, cause the apparatus to provide an indication to one or more user equipment if transmission of a signaling message by a user equipment using a small data transmission procedure in an inactive state of the user equipment is enabled

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
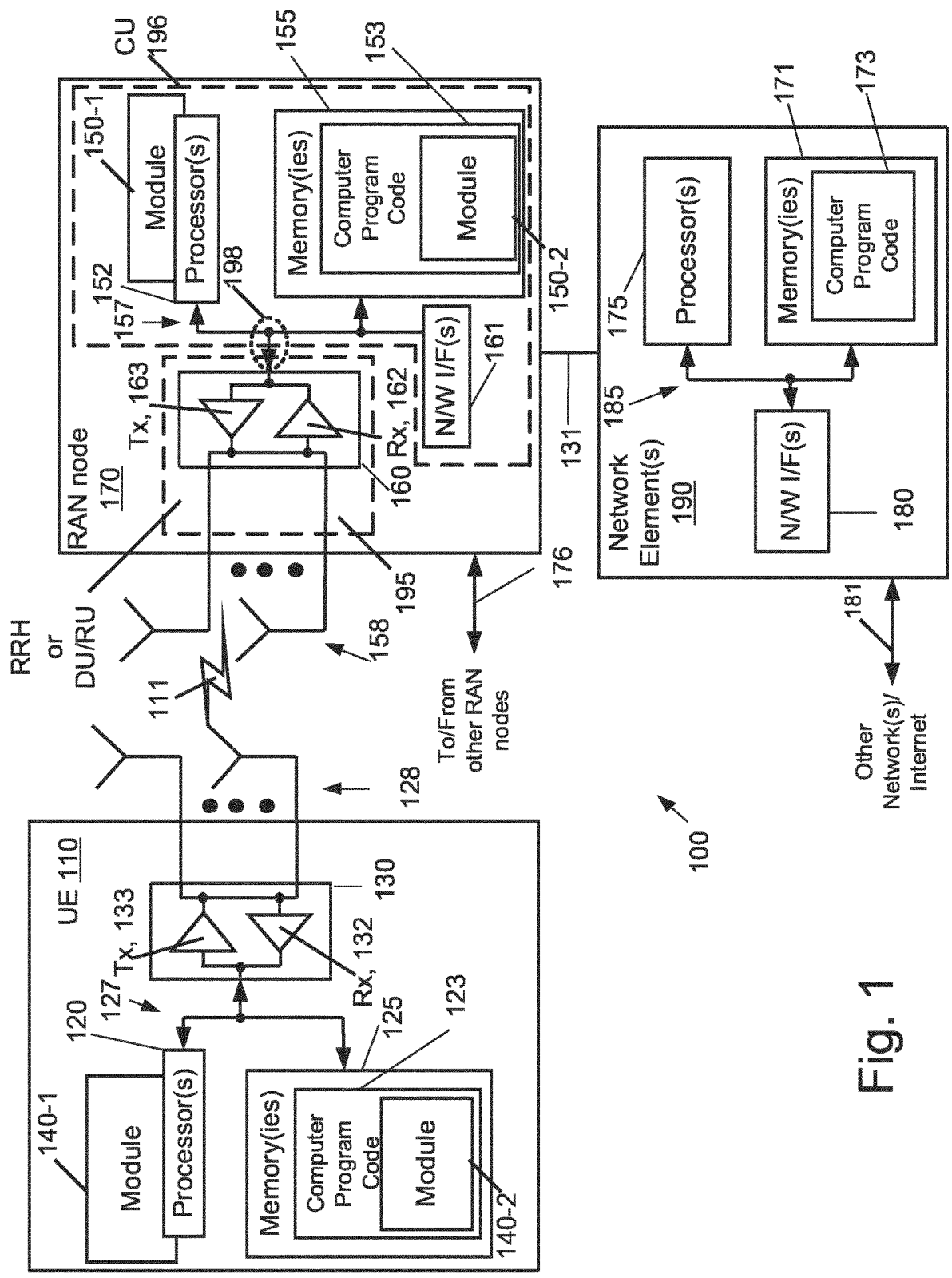
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may also be implemented as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

Figure 2:
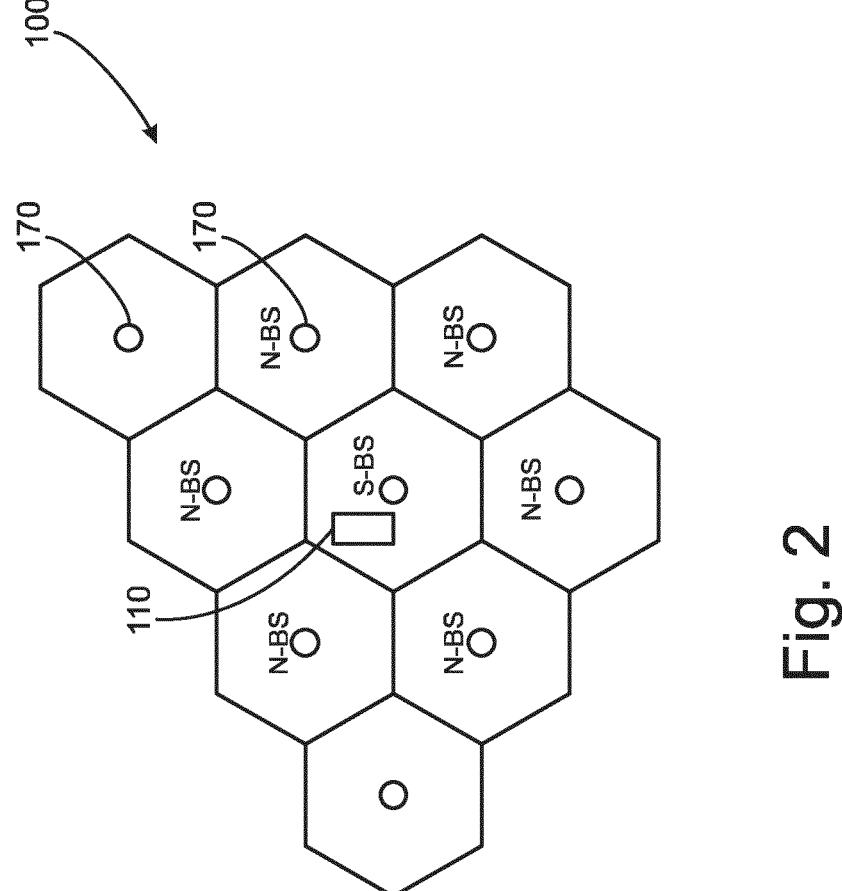
FIG. 2 illustrates a part of a wireless network having several base stations and an exemplary user equipment.

FIG. 2 illustrates a part of a wireless network 100 having several base stations 170 and an exemplary user equipment 110. In FIG. 2 it is assumed that the base station marked as S-BS is the serving base station, when the user equipment is in connected state, and the base station where the user equipment is camped on when not in connected state. Some of the neighbouring base stations are labelled as N-BS in FIG. 2. In practical situations the serving base station and the camped on base station may change e.g. when the user equipment in moving, or if the signal strength from different base stations changes (e.g. signals from a neighbouring base station N-BS becomes stronger than signals from the currently serving base station.

When the user equipment 110 is in the inactive state (RRC_INACTIVE), data transmission from the user equipment 110 to the cell is normally prevented. Hence, the user equipment 110 should resume the connection i.e. to change the state of the user equipment 110 to the connected state (RRC_CONNECTED) to be able to receive data from the network (mobile terminated MT, downlink DL) and transmit data to the network (mobile originated MO, uplink UL). Thus, connection setup and subsequently release to the inactive state typically happens for each data transmission irrespective of how small and infrequent the data packets are. This results in unnecessary power consumption and signalling overhead.

So called "Signalling Radio Bearers" (SRBs) are defined for NR as Radio Bearers (RBs) which can be used for transmission of certain types of messages such as RRC or NAS (non-access stratum) messages. In accordance with an example, the following signalling radio bearers are defined:

SRB0 is for RRC messages using a common control channel (CCCH logical channel);

SRB1 is for RRC messages, which may include a piggy-backed NAS message, as well as for NAS messages prior to the establishment of SRB2, all using a dedicated control channel (DCCH logical channel);

SRB2 is for NAS messages, all using DCCH logical channel. SRB2 has a lower priority than SRB1 and may be configured by the network after AS security activation;

SRB3 is for specific RRC messages when UE is in NG-RAN E-UTRA-NR dual connectivity ((NG)EN-DC) or in NR-NR dual connectivity (NR-DC), all using DCCH logical channel.

In the following some embodiments are described in which transmission of relatively short (small) messages is enabled also when the user equipment 110 is in the inactive state without establishing the connection i.e. the user equipment remains in the inactive state. This kind of transmission is also called as inactive state message transmission in this specification.

In accordance with some embodiments, the network decides if transmission of small data from the user equipment is allowed in the inactive state and if so, what kind of messages are allowed. Further, the network may also decide e.g. the maximum length for the small data messages. These decisions may be made by a network operator who enters those small data transmission related parameters to the wireless communication network, or they may be determined by the manufacturer of elements of the wireless communication network and/or by some other entity.

In other words, the network controls which RRC messages are allowed to use the small data transmission mechanism/procedure SDT. The network indicates the RRC messages that are allowed to use SDT, including whether the RRC messages are sent using a special RRC container or the existing messages. This could also include using a different signalling radio bearer than normally. For example, a signalling radio bearer 2 (SRB2) could be used for a message, or the data could be included in a container whose type is indicated via the message.

On the other hand, if transmission of small data from the user equipment is not allowed in the inactive state, the network may or may not provide any indication that transmission of small data from the user equipment is not allowed in the inactive state.

In accordance with an embodiment, a separate signalling radio bearer can be introduced, wherein that signalling radio bearer would be allowed to use small data transmission, when the user equipment is in inactive state RRC_INACTIVE and only a set of known messages (i.e. a configured set) would be allowed on that signalling radio bearer.

The configuration of which RRC messages to send could either be given in a dedicated manner or via broadcast information (i.e. in a system information block, SIB). It may also be possible to utilize both of these methods wherein broadcast information might supersede dedicated configuration after a known time or whenever the user equipment changes the serving cell. Alternatively, the network could allow any UE originated signalling (i.e., no mobile originated data) to use SDT with a single flag.

In accordance with an embodiment, the network may configure UE with RRC procedures the UE performs in RRC_INACTIVE state. In some examples, by means of this, any RRC message triggered to be transmitted by the UE based on the RRC procedures may be allowed to be sent over SDT. In some examples, NW may also indicate which RRC procedures are allowed to use SDT. As a matter of example, NW may configure UE to provide assistance information while the UE is in inactive state RRC_INACTIVE and in some examples, the UE assistance information may use SDT procedure.

In accordance with an embodiment, the network may configure UE that at least one SRB is allowed to use SDT. In some examples, this could be SRB specific configuration or simple configuration to allow SDT for all SRBs. In some examples, any RRC message transmitted via the at least one SRB may be allowed to use SDT procedure. In some examples, RRC and NAS messages may be allowed separately and the UE may be allowed to transmit only RRC or NAS messages or both over the SDT. In some examples, the NAS messages are embedded into RRC messages. In some examples, the NW may configure the allowance for the UE with dedicated RRC signalling or by means of system information broadcast. In some examples, the UE determines the allowance in a pre-defined manner (e.g., written into technical specification) and in that case, NW may not configure the allowance for the UE.

In the following some examples of messages which could be transmitted by utilizing the small data transmission mechanism are presented:

UEAssistanceInformation by which the user equipment may inform the network of the UE's delay budget report, overheating assistance information, Multicast Broadcast Messaging Service (MBMS) interest, or RRC state preference information e.g. IDLE or CONNECTED SidelinkUEInformationNR (for instance related to V2X (Vehicle-to-anything) frequencies of interest)

ULInformationTransfer

RRC connection resume procedure for RAN Area Update

Any control messages related to an MBMS counting or MBMS error correction procedure Logged measurement reporting MeasurementReport.

Additional criteria for the logged measurement reporting might be configured to specify when the logged measurement can be reported via SDT e.g. timer or reporting quantity threshold, both of which could depend on the measurement target i.e. whether WLAN, BT, NR . . . is measured. This could be for both MDT as well as IDLE mode measurement purposes.

As to the measurement report, the network may establish RRC Connection right after SDT transmission and the measurement report may include information about serving and neighbor cell measurements. The measurement report could also include, e.g., the EMR (Early Measurement Report) measurement results.

It should be noted here that the network may allow all of the possible message causes or only a subset of them. It may further be possible that the allowed message causes vary in different times, in different situations, in different areas of a network and/or for different user equipment, etc.

A size threshold could also be configured so that SDT for control plane signalling is only used for the RRC messages smaller or equal to that threshold. An additional indication could also convey whether RRC segmentation is allowed for indicating RRC messages with multiple uses of the SDT procedure.

In one example size thresholds could be configured per SRB by the network.

In one example allowed SRBs for SDT could be configured by the network. If no allowed SRB(s) is configured the UE is not allowed to use SDT for RRC messages.

In accordance with an embodiment, the size threshold parameter is valid for both transmission of data other than RRC messages to the network (uplink data, "UL data") and for RRC message(s). In this option it could be defined (or configured) whether the uplink data or the RRC data has higher priority i.e. which of them is transmitted first in case both cannot be transmitted at the same time. This kind of situation may occur, for example, if the combined size of the uplink data and the RRC message(s) is greater than the size threshold.

In accordance with another embodiment, a separate size threshold parameter is defined for uplink data and for RRC message(s).

In accordance with an embodiment, the size threshold parameter and the list of messages which can be sent are combined wherein both conditions have to be fulfilled before the small data transmission mechanism is allowed to be used. In other words, only if the message is allowed and only if that message is smaller than (or equal to) the threshold then it can be sent.

In a situation in which more than one message waiting for transmission satisfy the criteria, a priority criteria could be introduced, wherein only the message of the highest priority is sent. If the size threshold is also configured, then only the highest priority messages which—when combined—are smaller than (or equal to) the threshold are sent.

The priority could be configured at the same time as the list of messages allowed. If only one message is configured, the configuration of the priority could be optional.

In accordance with an embodiment, the RAN node 170 forms a configuration message in which small message transmission related parameters are transmitted to one or more user equipment. For example, the configuration message may be a RRCRelease message which the RAN node 170 may use to push a certain user equipment to the inactive state. This kind of message may be thought as a message dedicated to a certain receiver. As another example, the configuration message may be a broadcast message such as a cell select info message which don't have a dedicated receiver but all user equipment within the serving area of the RAN node 170 may be able to receive and interpret the message. Also other messages may be used for transmitting the parameters to the user equipment.

An example structure of the RRCRelease message is shown below, but some parts unnecessary for understanding the idea of the transmission of those particular parameters being omitted:

```
RRCRelease ::=                              SEQUENCE {
    rrc-TransactionIdentifier                   RRC-TransactionIdentifier,
    criticalExtensions                          CHOICE {
        rrcRelease                                  RRCRelease-IEs,
        criticalExtensionsFuture                    SEQUENCE { }
    }
}
RRCRelease-IEs ::=                          SEQUENCE {
    redirectedCarrierInfo                       RedirectedCarrierInfo
OPTIONAL,   -- Need N
    cellReselectionPriorities                   CellReselectionPriorities
OPTIONAL,   -- Need R
    suspendConfig                               SuspendConfig
OPTIONAL,   -- Need R
    deprioritisationReq                         SEQUENCE {
        deprioritisationType                        ENUMERATED {frequency, nr},
        deprioritisationTimer                       ENUMERATED {min5, min10, min15,
min30}
    }
OPTIONAL,   -- Need N
    lateNonCriticalExtension                    OCTET STRING
OPTIONAL,
    nonCriticalExtension                        RRCRelease-v1540-IEs
OPTIONAL
}
-- UNNECESSARY PARTS OMITTED
SuspendConfig ::=                           SEQUENCE {
    fullI-RNTI                                  I-RNTI-Value,
    shortI-RNTI                                 ShortI-RNTI-Value,
    ran-PagingCycle                             PagingCycle,
    ran-NotificationAreaInfo                    RAN-NotificationAreaInfo
OPTIONAL,   -- Need M
    t380                                        PeriodicRNAU-TimerValue
OPTIONAL,   -- Need R
    nextHopChainingCount                        NextHopChainingCount,
    ...,
    [[ sdt-RRC-Config-r17                       sdt-RRC-Config-r17   OPTIONAL -- Need N
    ]]
}
SDT-RRC-Config-r17 ::= SEQUENCE {
    allowedSDT-RRC-CauseList-r17                SEQUENCE (1..maxSDT-RRC-Causes-r17) OF
SDT-Cause,
    sizeThreshold-r17                           INTEGER (1..256),
    allowRRC-Segmentation                       ENUMERATED {true}   OPTIONAL   -- Need R
    ...
}
```

In this example the last, underlined section describes the parameters related to the enablement of small data transmission in the inactive state. The following describes the meaning of definitions of the signalling example.

SDT-RRC-Config-r17 defines the signalling element which comprises a sequence of parameters. First in this signalling element is the list of allowed causes of small data allowedSDT-RRC-CauseList-r17 which may be transmitted in the inactive state. The list comprises zero, one or more causes (SDT-Cause). The causes may be indicated by predetermined values, each of which defines one cause of small data.

maxSDT-RRC-Causes-r17 indicates a maximum allowed number of causes SDT-Cause in the list.

The parameter sizeThreshold-r17 may be used to indicate the maximum size of the small data which is allowed to be transmitted using this mechanism. In accordance with an embodiment, the maximum size is an integer number between 1 and 256 inclusive. In accordance with an embodiment, the maximum size is indicated as an integer number between 0 and 255 inclusive wherein the actual maximum size is one greater than the indication i.e. sizeThreshold-r17+1.

There may also be a parameter allowRRC-Segmentation which indicates whether a message is allowed to be segmented to multiple small messages which could then be transmitted as multiple small data packets. If the parameter allowRRC-Segmentation is present, it can have a value of true or false. True indicates that the segmentation is allowed and false indicate that the segmentation is not allowed. In accordance with another embodiment, the parameter allowRRC-Segmentation is only present when a message is allowed to be segmented to multiple small messages.

It should be noted that the expressions Need R (Release) and Need N (No action) in the above example indicate that if that particular field is absent, the previous value of that parameter should be released (Need R) or is a one-time parameter (Need N), wherein the user equipment does not take any actions regarding such parameter when the field is absent.

In the following another example is presented for the configuration message. In this example, the configuration is transmitted in SIB1 as broadcast signalling using the above structure as shown below:

```
SIB1 ::=                       SEQUENCE {
    cellSelectionInfo                              SEQUENCE {
        q-RxLevMin                                     Q-RxLevMin,
        q-RxLevMinOffset                               INTEGER (1..8)
    OPTIONAL,            -- Need S
        q-RxLevMinSUL                                  Q-RxLevMin
    OPTIONAL,            -- Need R
        q-QualMin                                      Q-QualMin
    OPTIONAL,            -- Need S
        q-QualMinOffset                                INTEGER (1..8)
    OPTIONAL             -- Need S
    }
    OPTIONAL,                -- Cond Standalone
    cellAccessRelatedInfo                          CellAccessRelatedInfo,
    connEstFailureControl                          ConnEstFailureControl
    OPTIONAL,            -- Need R
    si-SchedulingInfo                              SI-SchedulingInfo
    OPTIONAL,            -- Need R
    servingCellConfigCommon                        ServingCellConfigCommonSIB
    OPTIONAL,            -- Need R
    ims-EmergencySupport                           ENUMERATED {true}
    OPTIONAL,            -- Need R
    eCallOverIMS-Support                           ENUMERATED {true}
    OPTIONAL,            -- Need R
    ue-TimersAndConstants                          UE-TimersAndConstants
    OPTIONAL,            -- Need R
    uac-BarringInfo                                SEQUENCE {
        uac-BarringForCommon                           UAC-BarringPerCatList
    OPTIONAL,            -- Need S
        uac-BarringPerPLMN-List                        UAC-BarringPerPLMN-List
    OPTIONAL,            -- Need S
        uac-BarringInfoSetList                         UAC-BarringInfoSetList,
        uac-AccessCategory1-SelectionAssistanceInfo CHOICE {
                    plmnCommon                             UAC-AccessCategory1-
SelectionAssistanceInfo,
                    individualPLMNList                     SEQUENCE (SIZE (2..maxPLMN) )
    OF UAC-AccessCategory1-SelectionAssistanceInfo
        }
    OPTIONAL             -- Need S
    }
    OPTIONAL,            -- Need R
    useFullResumeID                                ENUMERATED {true}
    OPTIONAL,            -- Need R
    lateNonCriticalExtension                       OCTET STRING
    OPTIONAL,
    nonCriticalExtension                           SIB1-v1610-IEs
    OPTIONAL
}
SIB1-v1610-IEs ::=                             SEQUENCE {
    idleModeMeasurementsEUTRA-r16                  ENUMERATED {true}
    OPTIONAL,  -- Need R
    idleModeMeasurementsNR-r16                     ENUMERATED {true}
```

-continued

```
OPTIONAL,  -- Need R
   posSI-SchedulingInfo-r16          PosSI-SchedulingInfo-r16
OPTIONAL,  -- Need R
   nonCriticalExtension              SIB1-v17xy-IEs
OPTIONAL
}
SIB1-v17xy-IEs ::=                   SEQUENCE {
   sdt-RRC-Config-r17               sdt-RRC-Config-r17   OPTIONAL   -- Need R
}
SDT-RRC-Config-r17 ::= SEQUENCE {
   allowedSDT-RRC-CauseList-r17     SEQUENCE (1..maxSDT-RRC-Causes-r17) OF
SDT-Cause,
   sizeThreshold-r17                INTEGER (1..256),
   allowRRC-Segmentation            ENUMERATED {true}   OPTIONAL   -- Need R
   ...
}
```

Figure 3B:
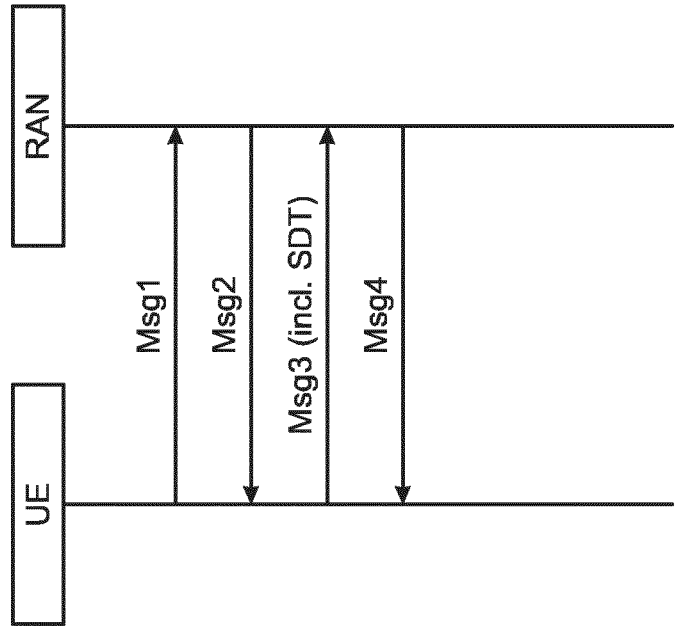
FIG. 3*b* shows an example of transmission of the small data utilizing a 4-step RACH transmission.
Figure 3A:
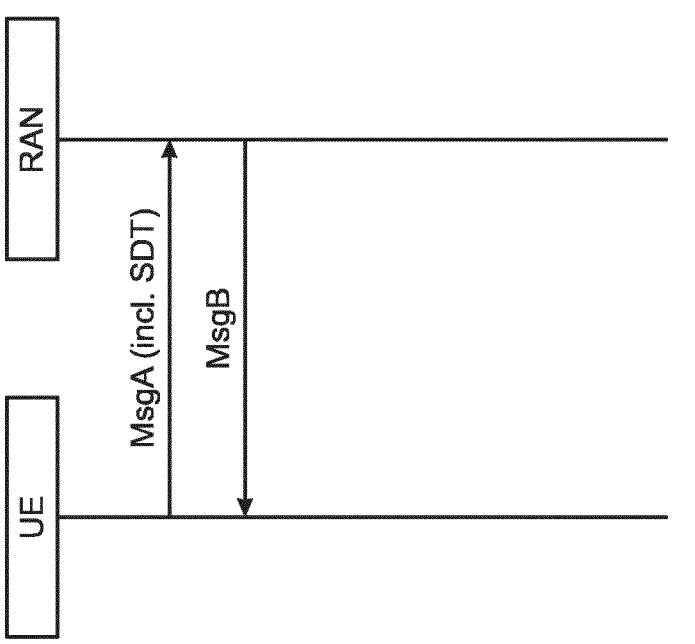
FIG. 3*a* shows an example of transmission of the small data utilizing a 2-step RACH transmission.

In accordance with an embodiment, transmission of the small data is performed utilizing the so-called 2-step RACH transmission i.e. one (a first) message (MSGA) from the user equipment to the network, and a second (a reply) message (MSGB) from the network to the user equipment. In this case the small data is inserted in the first message from the user equipment to the network as is illustrated in the signalling diagram of FIG. 3a.

In accordance with another embodiment, transmission of the small data is performed utilizing the so-called 4-step RACH transmission i.e. two messages (a first and a third) message (MSG1, MSG3) from the user equipment to the The RRC messages could also be restricted to use a specific small data transmission mechanism which could also be configured RRC message or SRB specifically.

In accordance with an embodiment, a user equipment could always apply default configurations specified for the SRBs when used for small data transmission.

In the following, an example of a signalling mechanism for sending a single RRC message via the small data transmission mechanism is described. Sending multiple RRC messages is a straightforward extension of this. In this example SRB0 is used, but also another SRB could be used.

The following RRCSmallDataRequest message could be used to send data to network using SDT procedure.

```
Signalling radio bearer: SRB0
RLC-SAP: TM
Logical channel: CCCH
Direction: UE to Network
RRCSmallDataRequest message
-- ASN1START
-- TAG-RRCSMALLDATAQUEST-START
RRCSmallDataRequest-r15 ::=          SEQUENCE {
   criticalExtensions                CHOICE {
      rrcSmallDataRequest-r15           RRCSmallDataRequest-r15-IEs,
      criticalExtensionsFuture          CHOICE {
      spare1NULL,
         criticalExtensionsFuture-r16 SEQUENCE { }
      }
   }
}
RRCSmallDataRequest-r15-IEs ::= SEQUENCE {
   sdt-UE-Identity                   ShortI-RNTI-Value,
   sdt-MAC-I                         BIT STRING (SIZE (16)),
   sdt-Payload                       STD-Payload,
   nonCriticalExtension              SEQUENCE { }     OPTIONAL
}
SDT-Payload ::= SEQUENCE {
   sdt-Cause                         SDT-Cause,
   data                              OCTET STRING
}
SDT-Cause ::= ENUMERATED {mo-data, nas-transfer, rnau, measReport, spare4,
spare3, spare2, spare1}
-- TAG-RRCSMALLDATAQUEST-STOP
-- ASN1STOP
``` network, and two messages (a second and a fourth) message (MSG2, MSG4) from the network to the user equipment. In this case the small data is inserted in the third message, as is illustrated in the signalling diagram of FIG. 3b.

In accordance with yet another embodiment, transmission of the small data is performed utilizing a secondary cell group (SCG) via configured grant. In this case the small data is transmitted in a configured grant message.

In this example the request includes identity of the user equipment sat-UE-Identity, and the payload field includes indication of the cause of the small data (one of mo-data, nas-transfer, rnau and measReport) and the actual small data in the data field.

When the network receives the request it may obtain inter alia the small data from the message and e.g. store it in a memory and/or perform some task related to the data.

Figures 4, 5:
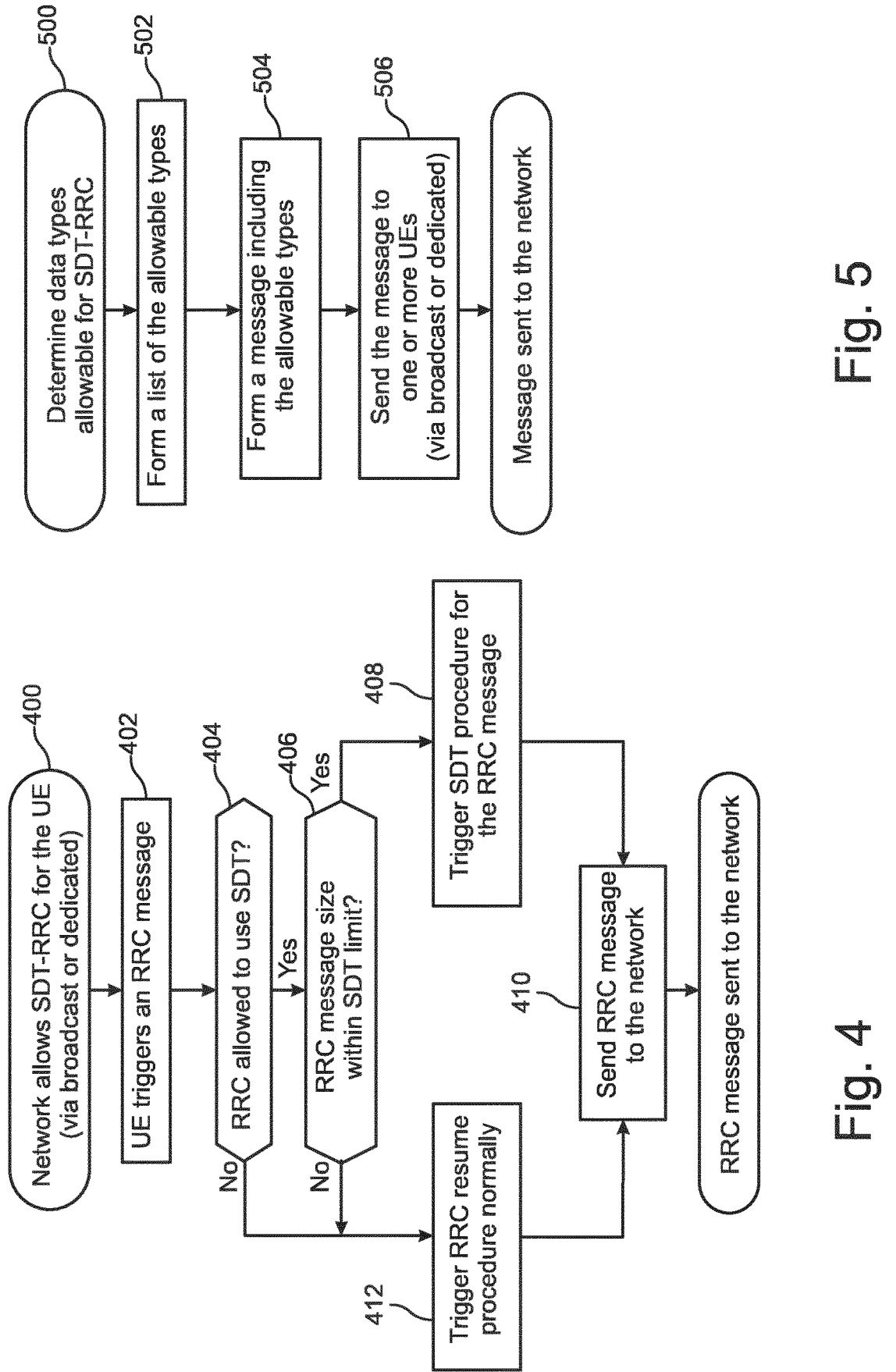
FIG. 4 shows an exemplary flow chart illustrating operations of a user equipment when transmitting messages as small data, in accordance with an embodiment.
FIG. 5 illustrates as a flow diagram indication by a network element data causes which are allowed to be transmitted by a user equipment utilizing small data transmission mechanism, in accordance with an embodiment.

FIG. 4 is a flow diagram which illustrates some actions by a user equipment when it aims to transmit small data amounts, in accordance with an embodiment.

The user equipment 110 receives indication of causes which are allowed to be transmitted by utilizing the small data transmission mechanism (block 400 in FIG. 4). The indication may have been transmitted by a network element (e.g. the RAN node 170) as a broadcast message or in a dedicated message to the user equipment 110. Such indication may have been transmitted well before the user equipment 110 has a small message to be transmitted, wherein the user equipment has stored the corresponding information in a memory for later use.

Figure 6:
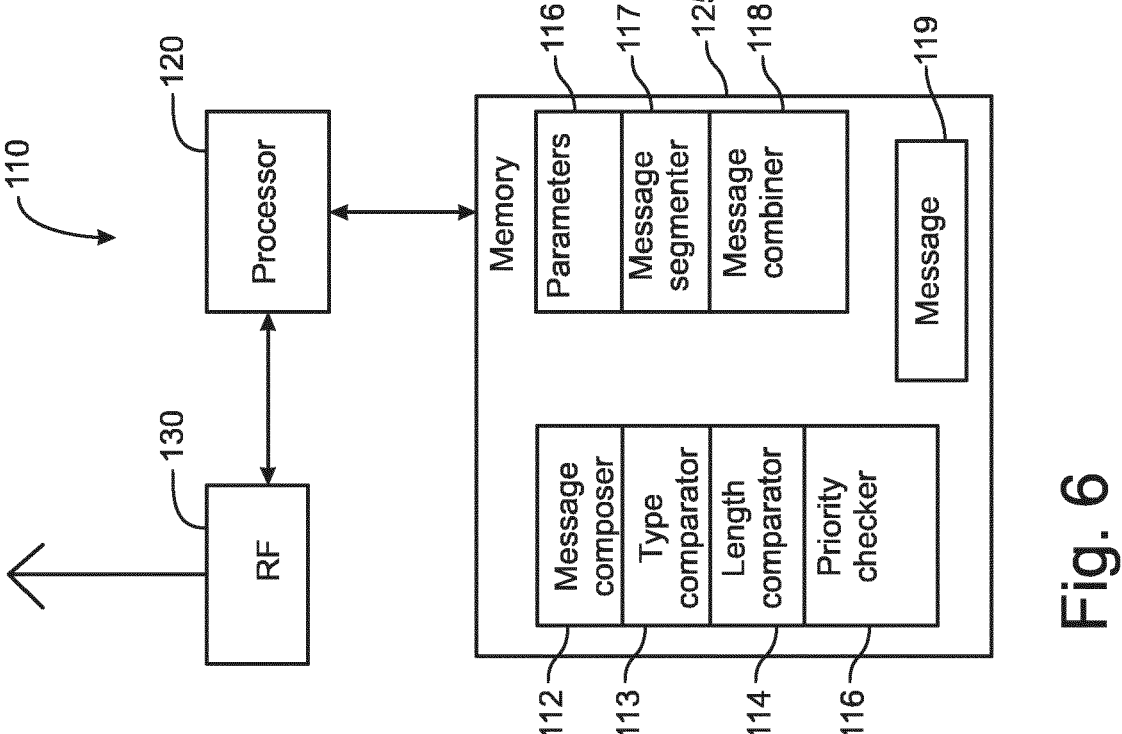
FIG. 6 shows a block diagram of an apparatus in accordance with at least some embodiments.

When there is a message 119 to be transmitted e.g. in the memory 125, a RRC message may be formed by a message composer 112 (FIG. 6) of the user equipment (block 402). A cause comparator 113 examines the cause of the message and compares the cause with the allowed causes (block 404). If the cause is among the allowed causes a length comparator 114 compares the length of the message with a maximum length parameter SDT_limit (block 406) and if the length is smaller than or equal to the maximum length, a small data transmission procedure is triggered (408), wherein certain signalling is performed between the user equipment and the network. A flag or other indication may be set to indicate that the small data transmission procedure can be used for the transmission of the message. The message is provided to a transmitter 133 for transmission (block 410). The transmitter 133 examines the value of the flag and determines that the transmission may be performed without changing the state from inactive to connected. Hence, the transmitter 133 and the network exchange corresponding signals to deliver the small message to the network (block 410). The details of the signalling depend e.g. on the cause of message exchange procedure selected for the small data transmission. For example. the above described 2-step or 4-step RACH transmission mechanism could be used.

If, however, the cause is not among the allowed causes or the length of the message is longer than the maximum length, a normal RRC resume procedure may be triggered (block 412), wherein the flag or another indicator is set to indicate that a normal message transmission procedure shall be used. The transmitter 133 examines the value of the flag and determines that the state should be changed from inactive to connected during the transmission of the message. Hence, the status of the user equipment is changed from inactive to connected (RRC Connected) and the transmitter 133 and the network exchange corresponding signals to deliver the message to the network (block 410).

In accordance with an embodiment, the user equipment 110 may have a priority checker 116 which may examine possible priority indications of messages in a situation in which there are more than one message to be transmitted utilizing the small data transmission mechanism. The priority checker 116 may then arrange the messages for transmission in the order indicated by the priorities, wherein messages are provided to the transmitter 133 in that order.

In accordance with an embodiment, the user equipment 110 may have a message segmenter 117 which may divide a message which is longer than the maximum length to segments having length smaller than or equal to the maximum length. In such a situation the segments of the message may be provided to the transmitter 133 one after the other so that the transmitter 133 transmits each segment using the small data transmission mechanism.

In accordance with an embodiment, the user equipment 110 may have a message combiner 118 which may combine two or more messages, which are shorter than the maximum length into one message so that the length of the combined message is shorter than or equal to the maximum length. Hence, the combine message may be transmitted using the small data transmission mechanism.

In accordance with an embodiment, the small data transmission mechanism is allowed for each cause of messages provided that the length of the message is shorter than or equal to the maximum length. Thus, the cause comparator 113 need not examine the cause of the message but the length comparator 114 compares the length of the message with the maximum length parameter SDT_limit and if the length is smaller than or equal to the maximum length, a small data transmission procedure can be triggered.

FIG. 5 illustrates as a flow diagram actions which may be performed by a network element, e.g. the RAT 170, to indicate data causes which are allowed to be transmitted by a user equipment utilizing small data transmission mechanism, in accordance with an embodiment. The network element determines (block 500) which kind of data shall be allowed to be transmitted by the small data mechanism and forms a list or some other information element in which those message causes are included (block 502). An example of such a list is allowedSDT-RRC-CauseList-r17 SEQUENCE (1 . . . maxSDT-RRC-Causes-r17) OF SDT-Cause, presented earlier in this specification. The network element may form a broadcast message (block 504) and include details of the allowed causes and some other information, for example the information described above in the example of the SIB1 for signalling the configuration. The message may then be transmitted (block 506).

In 5G the first frequency range FR1 is 450 MHz-6000 MHz, and the second frequency range FR2 is 24250 MHz-52600 MHz, but in some other wireless communication systems these frequency ranges may differ from those used in 5G and it may also be possible that only one frequency range is in use or more than two separate frequency ranges are in use.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 7:
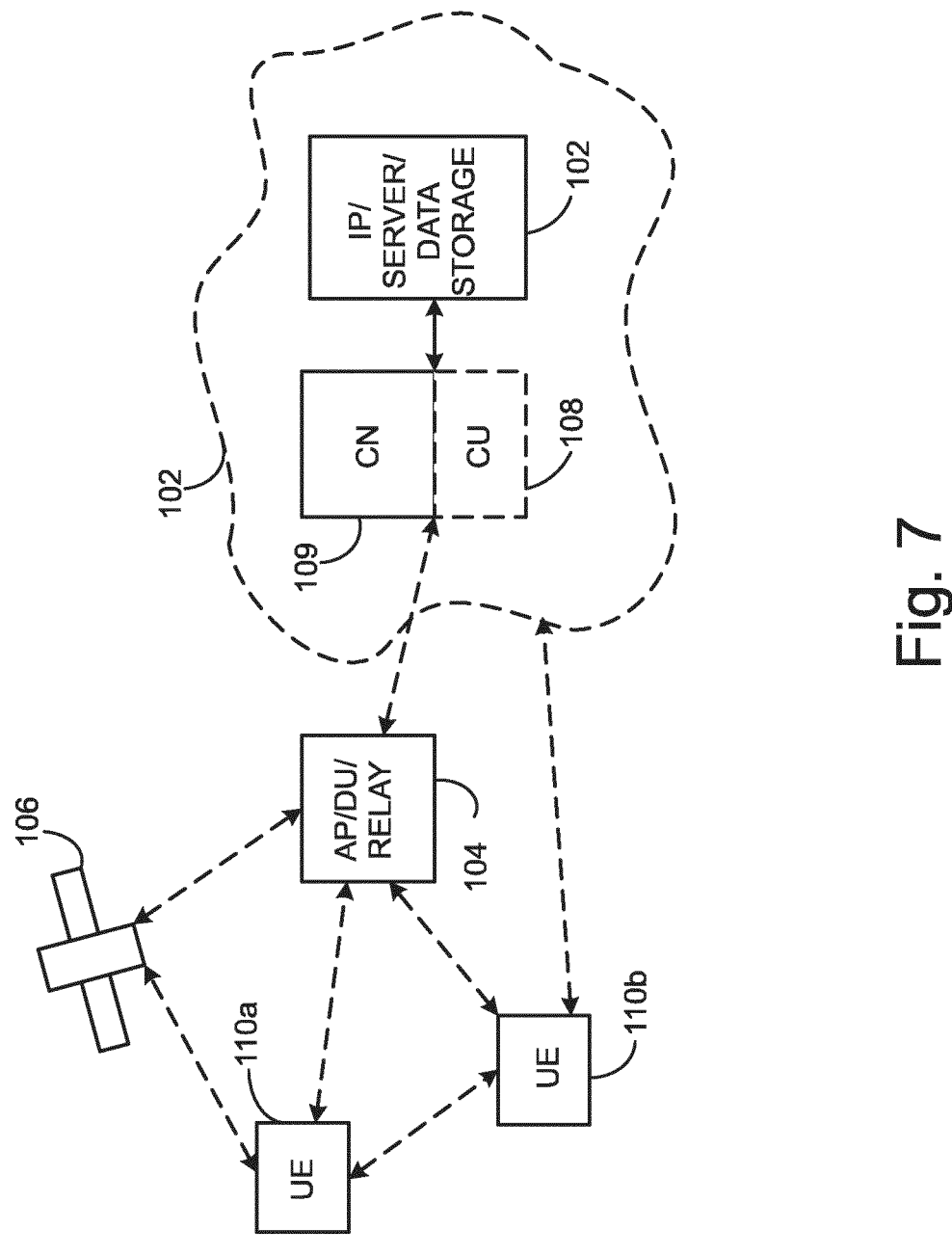
FIG. 7 shows a part of an exemplifying wireless communications access network in accordance with at least some embodiments.

FIG. 7 depicts examples of simplified system architectures only showing some elements and functional entities, all being logical units, whose implementation may differ from what is shown. The connections shown in FIG. 7 are logical connections; the actual physical connections may be different. It is apparent to a person skilled in the art that the system typically comprises also other functions and structures than those shown in FIG. 7.

The embodiments are not, however, restricted to the system given as an example but a person skilled in the art may apply the solution to other communication systems provided with necessary properties.

The example of FIG. 7 shows a part of an exemplifying radio access network.

FIG. 7 shows user equipments 110a and 110b configured to be in a wireless connection on one or more communication channels in a cell with an access node (such as (e/g) NodeB) 104 providing the cell. The physical link from a user equipment to a (e/g)NodeB is called uplink or reverse link and the physical link from the (e/g)NodeB to the user equipment is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 7) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 7 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 7 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 7). A HNB Gateway (HNB-GW), which is typically installed within an operator's network may aggregate traffic from a large number of HNBs back to a core network.

FIG. 9 illustrates an example of a block diagram of an apparatus 110 in accordance with at least some embodiments of the present invention. The apparatus 110 may be, for example, a part of the resource manager. The apparatus 110 comprises a processor 1022, a memory 1024 and a transceiver 1024. The processor is operatively connected to the transceiver for controlling the transceiver. The apparatus may comprise a memory 1026. The memory may be operatively connected to the processor. It should be appreciated that the memory may be a separate memory or included to the processor and/or the transceiver. The memory 1026 may be used to store information, for example, about maximum length, allowed causes, default values for some parameters and/or for some other information.

FIG. 9 also illustrates the operational units as a computer code stored in the memory but they may also be implemented using hardware components or as a mixture of computer code and hardware components.

According to an embodiment, the processor is configured to control the transceiver and/or to perform one or more functionalities described with a method according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A user equipment, comprising:

at least one processor; and at least one memory storing instructions that, when executed with the at least one processor, cause the user equipment to perform at least the following:

determine whether initiating a transmission of a signaling message using a small data transmission procedure is allowed in an inactive state of the user equipment;

based on the determination, causing the user equipment either to perform either:

transmit the signaling message using the small data transmission procedure in the inactive state; or transmit the signaling message using a procedure other than the small data transmission procedure;

obtain an indication from a wireless communication network about an availability and an order of transmission of each of more than one signalling radio bearer to be used in the transmission of the message with the small data transmission procedure;

based on the indication, select the order of transmission between an uplink data and radio resource control data on the basis of priority defined for uplink data and radio resource control data; and divide the signaling message that is longer than a maximum length into segments having length smaller than or equal to the maximum length.

2. The user equipment according to claim 1, wherein the user equipment is further caused to perform at least the following:

obtain one or more messages for transmission to a wireless communication network, said one or more messages having a cause of the message; and use the cause in the determining, wherein if the cause belongs to a set of causes allowed to use the small data transmission procedure in the inactive state, including the message in the signaling message to be transmitted.

3. The user equipment according to claim 1, wherein the user equipment is further caused to perform at least the following: obtain from a wireless communication network information of one or more causes of messages allowed for transmission with the user equipment to the wireless communication network in the inactive state of the user equipment.

4. The user equipment according to claim 1, wherein the user equipment is further caused to perform at least the following: obtain indication of a type of a container into which message is included for transmission.

5. The user equipment according to claim 1, wherein at least one condition is one or more of the following:

maximum length of the message;

priority of the message; or segmentation of the message to smaller segments enabled or disabled.

6. The user equipment according to claim 1, wherein the user equipment is further caused to perform at least the following: obtain the information of one or more causes of messages from the wireless communication network in a message causing the user equipment to change to the inactive state.

7. The user equipment according to claim 1, wherein the user equipment is further caused to perform at least the following: examine a flag indicative of whether any user equipment originated signalling is allowed to use the small data transmission procedure.

8. The user equipment according to claim 1, wherein the user equipment is further caused to perform at least the following:

transmit the message as a radio resource control message using a signalling radio bearer indicated to be used in the transmission of the message; and include indication of the cause of the message to the radio resource control message.

9. The user equipment according to claim 1, wherein the user equipment is further caused to perform at least the following:

receive a release message from a wireless communication network to change the state of the user equipment to the inactive state from a state different from the inactive state; and obtain at least one of said information of one or more allowed message causes at least one condition from the release message.

10. The user equipment according to claim 1, wherein a combined size of the uplink data and radio resource control data is greater than a maximum length defined for the inactive state.

11. An apparatus, comprising:

at least one processor; and at least one memory storing instructions that, when executed with the at least one processor, cause the apparatus to perform at least the following:

determine whether to enable transmission of a signaling message with a user equipment using a small data transmission procedure in an inactive state of the user equipment;

based on the determination, provide an indication to one or more user equipment if transmission of a signaling message with the user equipment using the small data transmission procedure in an inactive state of the user equipment is enabled;

communicate an indication from a wireless communication network about an availability and an order of transmission of each of more than one signalling radio bearer to be used in the transmission of the message with the small data transmission procedure; and transmit an indication of a type of a container into which a message shall be included for transmission with the small data transmission procedure;

wherein based on the indication from the wireless communication network, the order of transmission is selected between an uplink data and radio resource control data on the basis of priority defined for uplink data and radio resource control data.

12. The apparatus according to claim 11, wherein the apparatus is further caused to perform at least the following:

categorize at least one message cause among a plurality of message causes as allowed for transmission utilizing the small data transmission procedure by a with the user equipment in a wireless communication network when the user equipment is in an inactive state; and transmit the indication of the at least one message cause to one or more user equipment.

13. The apparatus according to claim 11, wherein the apparatus is further caused to perform at least the following: define at least one condition for a message allowed to be transmitted utilizing the small data transmission procedure in the inactive state.

14. The apparatus according to claim 13, wherein said at least one other condition comprises one or more of the following:

maximum length of the message;

priority of the message; or segmentation of the message to smaller segments enabled or disabled.

15. The apparatus according to claim 11, wherein the apparatus is further caused to perform at least the following:

transmit a release message to the user equipment to change the state of the user equipment to the inactive state from a state different from the inactive state; and include at least one of said information of one or more allowed message causes at least one condition to the release message.

16. The apparatus according to claim 11, wherein the apparatus is further caused to perform at least the following:

inform one or more of the following:

which radio resource control messages are allowed to use inactive state data transmission;

whether a special radio resource control container or existing messages are used; or if any user equipment originated signalling is allowed.

17. A user equipment, comprising:

at least one processor; and at least one memory storing instructions that, when executed with the at least one processor, cause the user equipment to perform at least the following:

determine whether initiating a transmission of a signaling message using a small data transmission procedure is allowed in an inactive state of the user equipment;

based on the determination, cause the user equipment either to perform either:

transmit the signaling message using the small data transmission procedure in the inactive state; or transmit the signaling message using a procedure other than the small data transmission procedure;

obtain an indication from a wireless communication network about an availability and an order of transmission of each of more than one signalling radio bearer to be used in the transmission of the message with the small data transmission procedure;

based on the indication, select the order of transmission between an uplink data and radio resource control data on the basis of priority defined for uplink data and radio resource control data; and obtain indication of a type of a container into which message is included for transmission.

18. A user equipment, comprising:

at least one processor; and at least one memory storing instructions that, when executed with the at least one processor, cause the user equipment to perform at least the following:

determine whether initiating a transmission of a signaling message using a small data transmission procedure is allowed in an inactive state of the user equipment;

based on the determination, cause the user equipment either to perform either:

transmit the signaling message using the small data transmission procedure in the inactive state; or transmit the signaling message using a procedure other than the small data transmission procedure;

obtain an indication from a wireless communication network about an availability and an order of transmission of each of more than one signalling radio bearer to be used in the transmission of the message with the small data transmission procedure;

based on the indication, select the order of transmission between an uplink data and radio resource control data on the basis of priority defined for uplink data and radio resource control data; and obtain the information of one or more causes of messages from the wireless communication network in a message causing the user equipment to change to the inactive state.

19. A user equipment, comprising:

at least one processor; and at least one memory storing instructions that, when executed with the at least one processor, cause the user equipment to perform at least the following:

determine whether initiating a transmission of a signaling message using a small data transmission procedure is allowed in an inactive state of the user equipment;

based on the determination, cause the user equipment either to perform either:

transmit the signaling message using the small data transmission procedure in the inactive state; or transmit the signaling message using a procedure other than the small data transmission procedure;

obtain an indication from a wireless communication network about an availability and an order of transmission of each of more than one signalling radio bearer to be used in the transmission of the message with the small data transmission procedure;

based on the indication, select the order of transmission between an uplink data and radio resource control data on the basis of priority defined for uplink data and radio resource control data;

receive a release message from a wireless communication network to change the state of the user equipment to the inactive state from a state different from the inactive state; and obtain at least one of said information of one or more allowed message causes at least one condition from the release message.

20. A user equipment, comprising:

at least one processor; and at least one memory storing instructions that, when executed with the at least one processor, cause the user equipment to perform at least the following:

determine whether initiating a transmission of a signaling message using a small data transmission procedure is allowed in an inactive state of the user equipment;

based on the determination, cause the user equipment either to perform either:

transmit the signaling message using the small data transmission procedure in the inactive state; or transmit the signaling message using a procedure other than the small data transmission procedure;

obtain an indication from a wireless communication network about an availability and an order of transmission of each of more than one signalling radio bearer to be used in the transmission of the message with the small data transmission procedure; and based on the indication, select the order of transmission between an uplink data and radio resource control data on the basis of priority defined for uplink data and radio resource control data;

wherein a combined size of the uplink data and radio resource control data is greater than a maximum length defined for the inactive state.

21. An apparatus, comprising:

at least one processor; and at least one memory storing instructions that, when executed with the at least one processor, cause the apparatus to perform at least the following:

determine whether to enable transmission of a signaling message with a user equipment using a small data transmission procedure in an inactive state of the user equipment;

based on the determination, provide an indication to one or more user equipment if transmission of a signaling message with the user equipment using the small data transmission procedure in an inactive state of the user equipment is enabled;

communicate an indication from a wireless communication network about an availability and an order of transmission of each of more than one signalling radio bearer to be used in the transmission of the message with the small data transmission procedure;

transmit a release message to the user equipment to change the state of the user equipment to the inactive state from a state different from the inactive state; and include at least one of said information of one or more allowed message causes at least one condition to the release message;

wherein based on the indication, the order of transmission is selected between an uplink data and radio resource control data on the basis of priority defined for uplink data and radio resource control data.

* * * * *